United States Patent Office 2,909,497
Patented Oct. 20, 1959

2,909,497

PRODUCT OF REACTION OF FATTY ACIDS, C=C AROMATICS AND EPOXIDE RESINS

Leonard E. Edelman, Pittsburgh, Pa., assignor to Westinghouse Electric Corporation, East Pittsburgh, Pa., a corporation of Pennsylvania No Drawing. Application July 21, 1953
Serial No. 369,518

6 Claims. (Cl. 260—23)

This invention relates to coating compositions comprising a joint reaction product of an unsaturated aromatic compound, an unsaturated fatty acid and a resinous epoxide, so formulated that coatings thereof may be superimposed at any time on previously applied coatings thereof without lifting or otherwise deteriorating them.

I have discovered a process for reacting an olefinically unsaturated aromatic compound, such as monostyrene, an olefinically unsaturated fatty acid and a resinous epoxide to produce a joint resinous composition that may be employed as an air drying or baking coating composition having excellent alkali and water resistance. A plurality of coatings of this composition may be applied to an object at any desirable interval without any danger of the previously applied coatings lifting or dissolving.

I am aware of Patent 2,596,737 which discloses one particular process for reacting similar ingredients. However, it has been found that the coating compositions produced in accordance with that patent cannot be superimposed safely unless the previous coatings have been quite completely cured by prolonged heating or air drying. Otherwise, a subsequently applied coating will lift the coating beneath it and produce defective coatings. When a coating of a composition prepared in accordance with that patent is applied to a surface and dried for 4 to 8 hours, and is then painted over with another coating of the same composition, the lowermost coating will lift and consequently the entire application of the two coatings becomes inferior and is defective. It will be appreciated that in many manufacturing operations it is highly desirable to be able to apply 2, 3 or more coatings of a composition in order to build up the composition to a substantial thickness or to repair or cover the flaws or areas from which a coating of the composition has been damaged, or accidentally or otherwise removed. It requires at least several days drying of the compositions disclosed in Patent 2,596,737 before one can feel safe in applying a second coating of this composition over the first one. Obviously, manufacturing operations will be greatly handicapped if required to wait for such long times between successive coatings.

The object of this invention is to provide for reacting an olefinically unsaturated aromatic compound and olefinically unsaturated fatty acid and an epoxide resin in a particular manner to produce a coating composition that will not lift when applied as a plurality of coatings on a member.

Other objects of the invention will be obvious and will in part appear hereinafter. For a better understanding of the nature and objects of the invention, reference should be had to the following detailed description.

In accordance with the objects of the invention I have found it critical to prepare the coating composition of the present invention by reacting an olefinically unsaturated aromatic compound, an olefinically unsaturated fatty acid and a resinous epoxide in precisely the order given and under the following conditions. In a reaction vessel provided with a reflux condenser and stirrer, the desired amount of an olefinically unsaturated fatty acid having at least 12 carbon atoms is heated to a temperature of between 150° C. and 220° C. With the stirrer in operation and the reflux condenser functioning, there is slowly introduced into the hot olefinically unsaturated fatty acid the unsaturated aromatic compound over a period of at least 1 hour and preferably over a period of 3 to 4 hours. Particularly suitable olefinically unsaturated aromatic compounds are aryl alkylene compounds such as monostyrene, alpha methylstyrene, paramethylstyrene and 3-monochlorostyrene, and mixtures of two or more. The amount of the unsaturated aromatic compound should be sufficient to provide less than 2 but more than 1 olefinic groups per olefinic group in the fatty acid. After the unsaturated aromatic compound has been added to the unsaturated fatty acid, the refluxing is carried out for at least ½ hour longer. The refluxing may be carried out for 2 or more hours after completing the addition of the unsaturated aromatic compound. There may be present a small amount of the order of 2%, based on the weight of the unsaturated aromatic compound, of a peroxide catalyst for catalyzing olefinic addition polymerization, for example, ditertiarybutyl peroxide. At the end of this final reflux period any unsaturated aromatic compound is distilled from the reaction kettle.

There is then added to the reaction mixture in the vessel a resinous epoxide which comprises a polyether having alternating glyceryl radicals and hydrocarbon radicals derived from a phenol united in a chain by ether oxygen atoms and with hydroxyl radicals present. The quantity of the resinous epoxide added should be sufficient to provide substantially 1 hydroxyl radical per carboxyl group in the unsaturated fatty acid. It is preferable to have a slight excess of the hydroxyl groups over the carboxyl groups. The reaction vessel is heated from a temperature of 190° C. to 250° C. or even higher for a period of time corresponding to approximately 1 hour at 230° C. until there is produced a joint resinous composition having an acid number of below 15, and preferably below 10, which is soluble in xylol. Upon cooling, this resinous composition can be dissolved in a solvent and is suitable for use in coating members.

The unsaturated fatty acids employed in practicing the invention should have at least 12 carbon atoms and have an iodine value of over 110 up to 400. There may be employed either a single unsaturated fatty acid or mixtures of two or more. Examples of suitable fatty acids are linseed oil fatty acids, linoleic acid, dehydrated castor oil, cottonseed oil acid, hempseed oil acids, and dimerized linoleic acid. Excellent results have been had with fatty acids having an average of from 1.8 to 2.4 unsaturated groups per molecule. Mixtures of such fatty acids have given good results. Thus a mixture of 25% rosin acids and 75% of linseed oil acids is suitable.

The resinous epoxide to be employed in the practice of the invention is preferably one prepared from reacting from 1.1 to 1.5 moles of epichlorhydrin for each mole of bisphenolbis(hydroxyphenyl)dimethylmethane. A particularly suitable resinous epoxide is one produced by reacting 1.25 moles of epichlorhydrin with one mole of bis(4-hydroxyphenyl)-2,2-propane to a resin epoxide equivalent of between 900 and 1000 and an equivalent weight of approximately 175. The epoxide equivalent is the grams of resin containing one epoxy group, and the equivalent weight is the grams of resin required to esterify one mole of a monobasic acid. The equivalent weight corresponds to the gram molecular weight of the resin containing one mole of a hydroxyl group. The resinous epoxides may be prepared in accordance with well known practices which need not be detailed herein, but are set forth in U.S. Patents 2,444,333; 2,582,985 and 2,506,486.

The following examples illustrate the practice of the invention:

Example I

Into a reaction vessel there was charged 200 parts by weight of linseed oil fatty acids comprising approximately 45% by weight of linolenic acid, 25% linoleic acid and 20% oleic acid, the fatty acid having approximately 2 olefinic groups per molecule. The stirrer of the reaction vessel was put into operation and carbon dioxide gas was employed to sparge the vessel. The fatty acid in the vessel was heated to a temperature between 180° C. and 190° C. and 200 parts by weight of monostyrene were introduced slowly over a period of three hours. Refluxing was employed throughout the addition of the monostyrene. After all of the monostyrene had been heated, refluxing was continued for an additional ½ hour and the temperature permitted to rise to about 230° C. A slight amount of unreacted styrene was distilled off during the last few minutes. Thereafter 300 parts by weight of a resinous epoxide prepared from 1.25 moles of epichlorhydrin and 1 mole of bisphenol and having an epoxide equivalent of approximately 950 and an equivalent weight of approximately 175 was added to a reaction mixture. The temperature of the mixture was increased to 245° C. and in three hours the joint reaction product had an acid value of between 2 and 3. The resinous reaction product had a viscosity, when dissolved in xylol to form a 50% solution, of L–M on the Gardner-Holdt scale.

The resinous reaction product of this example was dissolved in xylol to produce a 50% solution. Coatings of the solution applied to surfaces as a film 3 mils thick air dried tack free in approximately 10 minutes. Panels were coated with the solution of this example and were dried for various periods of time. A second coating was applied to the panels at the end of 2, 4, 8, 16, 24 and 48 hours, respectively. In no case did any of the coatings lift or otherwise suffer upon the application of the second coatings of the same composition.

Example II

The process of Example I was modified by employing a mixture comprising ⅔ monostyrene and ⅓ alpha-methylstyrene in place of the monostyrene of Example I. Otherwise the process was carried out as Example I. The resulting composition had a final acid value of 8.7 and a 50% solution in xylol at a viscosity of L. These 3 mil thick films of the composition resulted in air drying for 12 minutes.

Example III

The process of Example I was modified by substituting vinyltoluene in place of the monostyrene. The resulting resinous reaction product had a final reaction value of 6.6 and a viscosity of H when dissolved to produce a 50% solution in xylol. The air drying time to produce a 3 mil thick tack free film was 10 minutes.

Example IV

The reaction of Example I was followed except that the fatty acids comprised a mixture of equal parts by weight of rosin acids and linseed oil fatty acids. The acid value of the resinous composition was 9 and the viscosity of a 50% solution in xylol was L. The composition produced a 3 mil thick tack free film upon air drying for 10 minutes.

All of the above coating compositions of Examples II, III and IV were non-lifting when tested on panels in the manner set forth under Example I.

The compositions of the present invention may be modified by substituting for a portion of the unsaturated aromatic compound up to 15% by weight of acrylonitrile. The following example illustrates this feature of the invention:

Example V

The process of Example I was followed with the exception that 180 parts by weight of monostyrene and 20 parts by weight of acrylonitrile were mixed. Otherwise, the reaction is identical to that in Example I. The acid value of the final resinous reaction product was 2.8 and the viscosity of a 50% solution in xylol was X. A three mil thick film air dried tack free in 10 minutes.

Coatings of the composition of this Example V were found to be non-lifting when tested under the conditions set forth in Example I. Coatings of the composition of this Example V containing acrylonitrile were found to have a greatly improved arc resistance. Thus, where the arc resistance of the composition of Example I was 130 to 135 seconds, the arc resistance coatings of this Example V were 220 seconds.

Example VI

The process of Example I was followed with the exception that there were employed 180 parts by weight of linseed oil fatty acids and 20 parts by weight of dilinoleic acid. The acid value of the final composition was 3.5 and the viscosity of a 50% solution in xylol was V. Films of a thickness of 3 mils air dried tack free in 10 minutes.

The resins of the present invention are compatible with and can be blended with urea-aldehyde and melamine aldehyde resins. Thus, 100 parts by weight of the resin of Example I, for instance, may be mixed up to 60 parts by weight of either butylated urea formaldehyde resin or melamine formaldehyde resin and the mixtures dissolved in a solvent thereby producing a coating composition. As an example, a coating composition was prepared from 75% by weight of the resin of Example I and 25 parts by weight of solvent soluble butylated formaldehyde resin, all dissolved in xylol. Coatings of this mixed composition were applied to metal and glass bases. These films possessed excellent mar and scuff resistance. These compositions resisted lifting upon being recoated.

I have found that particularly satisfactory compositions are prepared by reacting, as described herein, 100 parts by weight of monostyrene to from 80 to 150 parts by weight of linseed oil fatty acids and after such addition the resinous epoxide is added in an amount from 125 to 175 parts by weight, the epoxide having an equivalent weight of approximately 175 and an epoxide equivalent of approximately 950. Resins prepared from these proportions reacted in the order and manner as heretofore set forth are non-lifting when recoated.

Pigments such as iron oxide, titanium dioxide, carbon black and zinc chromate and fillers such as silica and dyes may be incorporated in the composition. Coatings of the compositions may be baked or air dried. In either case, the films have excellent water and alkali resistance.

It will be understood that the above examples are illustrative and not limiting.

I claim as my invention:

1. In the process for preparing non-lifting resinous coating compositions, the steps carried out in the consecutive order given, comprising slowly introducing over a period of at least an hour an olefinically unsaturated aromatic compound selected from monoaryl alkenes having no other reactive group than the C=C group into a heated body of an olefinically unsaturated fatty acid having at least 12 carbon atoms, the temperature of the unsaturated fatty acid being from 150° C. to 220° C., the unsaturated fatty acid being refluxed during the addition of the unsaturated aromatic compound, the amount of the unsaturated aromatic compound added being sufficient to provide for from less than 2 to more than 1 olefinic group therefrom for each olefinic group in the unsaturated fatty acid, refluxing being carried out for at least approximately ½ hour to several hours after the required amount of the aromatic compound has been added, thereafter admixing with the resulting reaction product a resinous epoxide comprising a polyether having alternating glyceryl radicals and the hydrocarbon radicals of a phenol united in a chain by ether oxygen atoms and with hydroxyl radicals present therein, the resinous epoxide having an equivalent weight of approximately 175 and an epoxide equivalent of from 900 to 1000, the resinous epoxide being added in an amount to provide substantially one hydroxyl radical per carboxyl group in the unsaturated fatty acid, and heating the mixture at a temperature of from 190° C. to 250° C. for a period of time until there is produced a resinous composition of an acid number of below 15 and which is soluble in xylol.

2. The process of claim 1 wherein 100 parts by weight of monostyrene comprise the olefinically unsaturated compound, from 80 to 150 parts by weight of linseed oil fatty acids comprise the unsaturated fatty acid and from 125 to 175 parts by weight of resinous epoxide having an equivalent weight of approximately 175 and an epoxide equivalent of 950 comprises the epoxy resin.

3. The process of claim 1 wherein acrylonitrile in an amount of up to 15% of the weight of the aromatic compound is substituted for the same weight of the aromatic compound and admixed therewith and added to the heated fatty acid.

4. A resinous reaction product derived by slowly introducing over a period of at least an hour an olefinically unsaturated aromatic compound selected from monoaryl alkenes having no other reactive group than the C=C group into a heated body of an olefinically unsaturated fatty acid having at least 12 carbon atoms, the temperature of the unsaturated fatty acid being from 150° C. to 220° C., the unsaturated fatty acid being refluxed during the addition of the unsaturated aromatic compound, the amount of the unsaturated aromatic compound added being sufficient to provide for from less than 2 to more than 1 olefinic group therefrom for each olefinic group in the unsaturated fatty acid, refluxing being carried out for at least approximately ½ hour to several hours after the required amount of the aromatic compound has been added, thereafter admixing with the resulting reaction product a resinous epoxide comprising a polyether having alternating glyceryl radicals and the hydrocarbon radicals of a phenol united in a chain by ether oxygen atoms and with hydroxyl radicals present therein, the resinous epoxide having an equivalent weight of approximately 175 and an epoxide equivalent of from 900 to 1000, the resinous epoxide being added in an amount to provide substantially one hydroxyl radical per carboxyl group in the unsaturated fatty acid, and heating the mixture at a temperature of from 190° C. to 250° C. for a period of time until there is produced a resinous composition of an acid number of below 15 and which is soluble in xylol.

5. A resinous reaction product derived by slowly introducing over a period of at least an hour 100 parts by weight of monostyrene into from 80 to 150 parts by weight of linseed oil fatty acids, the fatty acids being maintained at a temperature of from 150° C. to 220° C. and being refluxed during the addition of the monostyrene, refluxing being carried out for at least approximately ½ hour to several hours after the monostyrene has been added, thereafter admixing with the resulting reaction product 125 to 175 parts by weight of a resinous epoxide having an equivalent weight of approximately 175 and an epoxide equivalent of 950, and heating the mixture at a temperature of from 190° C. to 250° C. for a period of time until there is produced a resinous composition of an acid number of below 15 and which is soluble in xylol.

6. A coating composition comprising (A) 100 parts by weight of the resinous reaction product derived by slowly introducing over a period of at least an hour an olefinically unsaturated aromatic compound selected from monoaryl alkenes having no other reactive group than the C=C group into a heated body of an olefinically unsaturated fatty acid having at least 12 carbon atoms, the temperature of the unsaturated fatty acid being from 150° C. to 220° C., the unsaturated fatty acid being refluxed during the addition of the unsaturated aromatic compound, the amount of the unsaturated aromatic compound added being sufficient to provide for from less than 2 to more than 1 olefinic group therefrom for each olefinic group in the unsaturated fatty acid, refluxing being carried out for at least approximately ½ hour to several hours after the required amount of the aromatic compound has been added, thereafter admixing with the resulting reaction product a resinous epoxide comprising a polyether having alternating glyceryl radicals and the hydrocarbon radicals of a phenol united in a chain by ether oxygen atoms and with hydroxyl radicals present therein, the resinous epoxide having an equivalent weight of approximately 175 and an epoxide equivalent of from 900 to 1000, the resinous epoxide being added in an amount to provide substantally one hydroxyl radical per carboxyl group in the unsaturated fatty acid, and heating the mixture at a temperature of from 190° C. to 250° C. for a period of time until there is produced a resinous composition of an acid number of below 15 and which is soluble in xylol, and (B) up to 60 parts by weight of at least one resin selected from the group consisting of urea-aldehyde and melamine-aldehyde resins, and (C) a solvent for the resins.

References Cited in the file of this patent

UNITED STATES PATENTS

| | | |
|---|---|---|
| 2,528,359 | Greenlee | Oct. 31, 1950 |
| 2,528,360 | Greenlee | Oct. 31, 1950 |
| 2,596,737 | Tess et al. | May 13, 1952 |
| 2,600,623 | Daniel et al. | June 17, 1952 |
| 2,639,272 | Griess et al. | May 19, 1953 |
| 2,689,834 | McNabb | Sept. 21, 1954 |